(12) United States Patent
Law et al.

(10) Patent No.: US 7,861,532 B2
(45) Date of Patent: Jan. 4, 2011

(54) SYSTEM AND METHODS FOR HEAT RECOVERY STEAM GENERATORS HOT PURGING

(75) Inventors: Joseph Robert Law, Greer, SC (US); Robert Lester Brooks, Greer, SC (US); Earl Jay Hamil, Greer, SC (US); Lawrence Melville Danner, Simpsonville, SC (US); Amie Leavengood Ervin, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 771 days.

(21) Appl. No.: 11/768,497

(22) Filed: Jun. 26, 2007

(65) Prior Publication Data

US 2009/0000267 A1    Jan. 1, 2009

(51) Int. Cl.
*F02C 1/00* (2006.01)
(52) U.S. Cl. .................. 60/772; 60/39.182; 60/39.5
(58) Field of Classification Search .............. 60/39.182, 60/39.511, 782, 785, 795, 39.5, 772
See application file for complete search history.

(56) References Cited

U.S. PATENT DOCUMENTS

| | | | |
|---|---|---|---|
| 3,255,586 A * | 6/1966 | Hennig et al. .................. 60/773 |
| 3,975,900 A | 8/1976 | Pfefferle | |
| 3,998,047 A * | 12/1976 | Walker ......................... 60/773 |
| 4,094,142 A | 6/1978 | Pfefferle | |
| 4,249,373 A | 2/1981 | Sotheran et al. | |
| 4,374,466 A | 2/1983 | Sotheran | |
| 4,864,811 A * | 9/1989 | Pfefferle ....................... 60/777 |
| 5,237,812 A | 8/1993 | Mumford | |
| 5,263,312 A | 11/1993 | Walker et al. | |
| 5,590,518 A | 1/1997 | Janes | |
| 5,826,429 A | 10/1998 | Beebe et al. | |
| 5,850,731 A | 12/1998 | Beebe et al. | |
| 5,881,549 A | 3/1999 | Janes | |
| 6,393,821 B1 * | 5/2002 | Prabhu ........................ 60/781 |
| 6,502,401 B1 | 1/2003 | Stats | |
| 6,543,234 B2 * | 4/2003 | Anand et al. .................. 60/772 |
| 6,588,198 B2 | 7/2003 | Stats | |
| 6,957,540 B1 | 10/2005 | Briesch et al. | |
| 7,107,774 B2 | 9/2006 | Radovich | |
| 7,124,591 B2 * | 10/2006 | Baer et al. ..................... 60/786 |
| 2003/0172656 A1 * | 9/2003 | Labasque et al. .............. 60/772 |
| 2005/0268594 A1 | 12/2005 | Kurihara et al. | |

\* cited by examiner

*Primary Examiner*—Michael Cuff
*Assistant Examiner*—Phutthiwat Wongwian
(74) *Attorney, Agent, or Firm*—Armstrong Teasdale LLP

(57) ABSTRACT

A method for operating an energy system includes calculating an auto-ignition temperature of a fuel in use with the energy system, storing the auto-ignition temperature in a system memory, unloading a gas turbine associated with the energy system to a pre-determined range of operations, controlling a temperature of the exhaust flow discharged from the gas turbine, opening an exhaust bypass damper to a pre-determined position to enable a pre-determined volume of air to enter an exhaust flow path defined within the energy system, and releasing the energy system for normal operation after a pre-determined amount of time has elapsed.

11 Claims, 2 Drawing Sheets

SYSTEM AND METHODS FOR HEAT RECOVERY STEAM GENERATORS HOT PURGING

BACKGROUND OF THE INVENTION

This invention relates generally to combined cycle power systems, such as those used in a power plant, and more specifically, to methods and systems for completing a hot purge of a heat recovery steam generator (HRSG).

At least some known combined cycle power systems include at least one gas turbine which powers a generator used to supply electrical power to a power grid. Exhaust from at least some known gas turbines is supplied to an HRSG that extracts heat from the exhaust to generate steam for use in other processes such as, but not limited to, driving a steam turbine and/or providing hot steam for heating or desalinization. Power generated by a steam turbine also drives an electrical generator that provides additional electrical power to the power grid.

Combined cycle power systems, that include a bypass damper in the exhaust flowpath, are often designed such that the bypass damper can be used to facilitate transitioning a gas turbine's exhaust path from simple cycle to combined cycle, and back, while under load. The primary regulatory guidance governing this equipment is NFPA 85 and ISO 21789. The practice of transitioning between modes is expressly permitted if the system startup includes a cold purge of both the exhaust flow path through the gas turbine and the HRSG.

However, more system operators are demanding operating scenarios in which a post-operational purge is conducted before placing equipment in the exhaust path into service, such as an HRSG. If a transition from simple cycle to combined cycle operation is required, it may be desirable to do so without shutting down the gas turbine. Such a practice, known as "hot purging" an exhaust path, is recognized in NFPA 85, but with strict limits. For example, the operation may only occur when the gas turbine exhaust temperatures are at least 100° F. below the lowest auto-ignition temperature (AIT) of any fuels or fuel mixes that may be introduced into either the gas turbine or any downstream firing equipment.

In addition, the International Organization for Standardization (ISO) has developed ISO 21789, which is a worldwide gas turbine safety standard. This standard permits gas turbine exhaust gases to be used for purging provided that they are proven, and controlled, to be less than 80% of the AIT of any flammable gases or vapors that may be present.

BRIEF DESCRIPTION OF THE INVENTION

In one aspect, some configurations of the present invention provide a method for operating an energy system. The method includes calculating an auto-ignition temperature of a fuel in use with the energy system and storing the auto-ignition temperature in a system memory. A gas turbine associated with the energy system is then unloaded to a pre-determined range of operations and the temperature of the exhaust flow discharged from the gas turbine is reduced. An exhaust bypass damper is then opened to a pre-determined position to enable a pre-determined volume of air to enter an exhaust flow path defined within the energy system. The energy system is then released for normal operation after a pre-determined amount of time has elapsed.

In another aspect, some configurations of the present invention provide a control system for use in operating an energy system. The control system includes a turbine control system and a control system processor configured to determine an auto-ignition temperature of the fuel in use with the energy system.

In a further aspect of the invention, some configurations of the present invention provide a method for controlling a hot purge of a heat recovery steam generator (HRSG). The HRSG is part of a combined-cycle power system including a control system processor and a system memory. The method includes calculating an auto-ignition temperature of a fuel in use with the energy system and storing the auto-ignition temperature in the system memory, unloading a gas turbine associated with the energy system to a hot purge range of operations, and controlling the operation of a plurality of inlet guide vanes of the gas turbine to control a temperature of the gas turbine exhaust. When the exhaust has reached a proper temperature, an exhaust bypass damper is opened to a hot purge position to enable a pre-determined volume of air to enter the heat recovery steam generator. The power system is released for normal operation after a pre-determined amount of time has elapsed.

DETAILED DESCRIPTION OF THE INVENTION

According to regulations, such as NFPA 85, a heat recovery steam generator (HRSG) must be purged of any hazardous gases before it can be put into operation. Using conventional procedures, this generally requires 20-30 minutes of purge time and such actions may only be accomplished in a combined-cycle power system when the associated gas turbine is offline and in an unfired condition. As such, using known purge procedures may increase the startup time of the system, and does not allow the system to produce power or support other processes until the purge cycle is complete and the gas turbine can be brought online.

Figure 1:
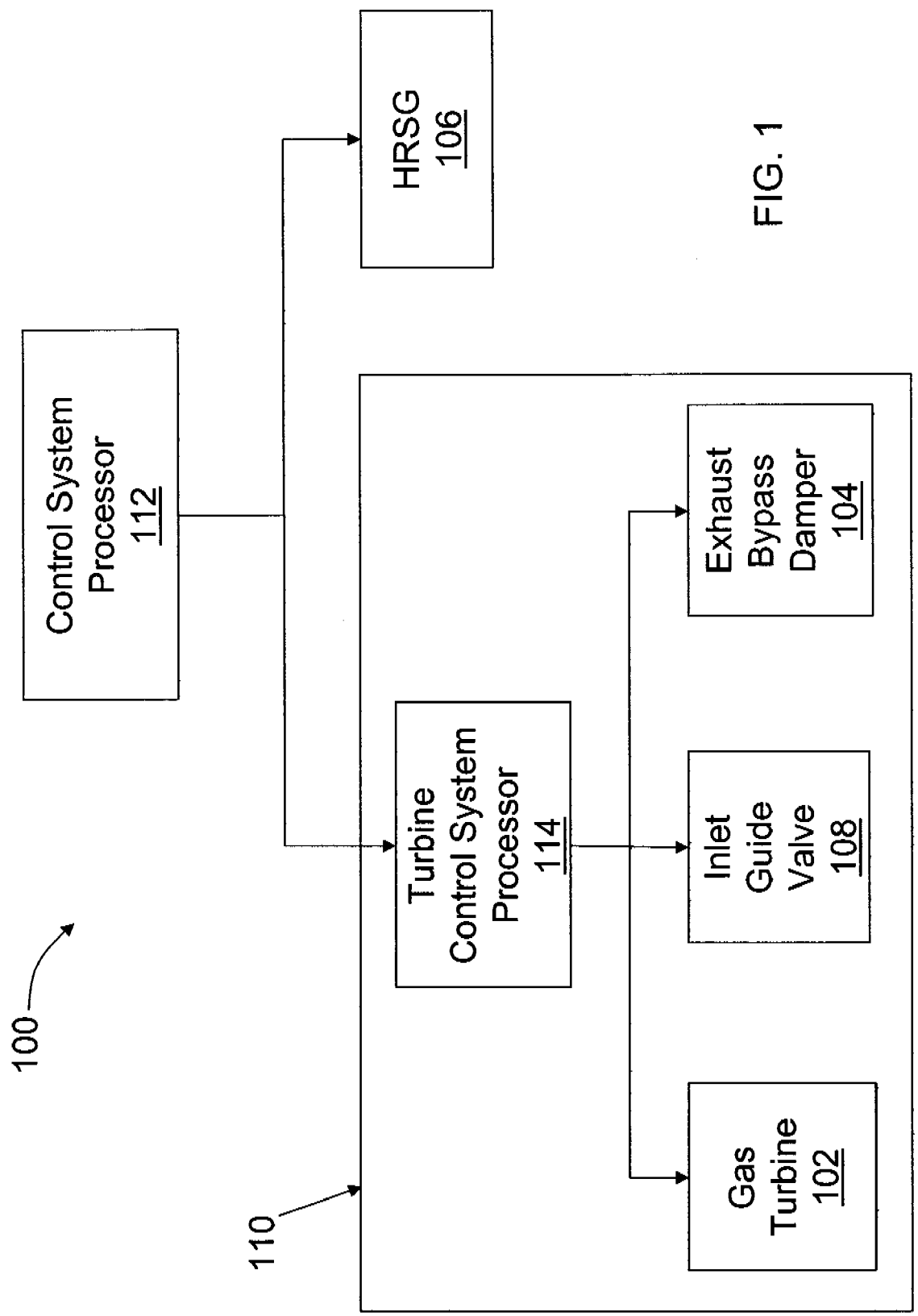
FIG. 1 is a block diagram of an exemplary control system that may be used to hot purge a heat recovery steam generator (HRSG) used in a combined cycle power system.

FIG. 1 is a block diagram of an exemplary control system 100 that may be used with a combined-cycle power system, such as those used in a power plant, that includes a gas turbine 102, an exhaust bypass damper 104, and a heat recovery steam generator (HRSG) 106. In the exemplary embodiment, HRSG 106 is coupled to gas turbine 102 and to other processes (not shown). Further, in the exemplary embodiment, control system 100 includes a turbine control system 110 and a control system processor 112.

In the exemplary embodiment, turbine control system 110 is coupled to a gas turbine 102, a plurality of inlet guide vanes (IGVs) 108, an exhaust bypass damper 104, and a turbine control system processor 114. Turbine control system processor 114 is configured to monitor and adjust the position of the IGVs 108. When the IGVs 108 are open, air flow into gas turbine 102 will increase to facilitate reducing the temperature of the gas turbine exhaust gas. Similarly, when the IGVs 108 are closed, the temperature of the gas turbine exhaust gas increases. Turbine control system processor 114 is also configured to monitor and adjust the load of gas turbine 102. Moreover, turbine control system processor 114 is configured to monitor and adjust the position of exhaust bypass damper 104. Sensors (not shown) coupled to gas turbine 102, IGVs 108, and exhaust bypass damper 104 are also electrically coupled to turbine control system processor 114. These sensors communicate data to turbine control system processor 114 such as, but not limited to, the load of gas turbine 102, the temperature of the gas turbine exhaust, the relative position of the IGVs 108, and the relative position of exhaust bypass damper 104. When exhaust bypass damper 104 is open, gas turbine exhaust bypasses HRSG 106, and air enters HRSG 106, purging HRSG 106 of gas turbine exhaust and/or other potentially hazardous gases and vapors.

In the exemplary embodiment, control system processor 112 is electrically coupled to turbine control system processor 114. Turbine control system processor 114 calculates the auto-ignition temperature (AIT) of the fuel in use in the power system, and stores the calculated AIT in a system memory (not shown). Turbine control system processor 114 compares the gas turbine exhaust temperature to the AIT of the fuel. As mentioned above, NFPA 85 requires that the gas turbine exhaust be at least 100° F. below the AIT of the fuel in use. Additionally, ISO 21789 requires that the gas turbine exhaust temperature be less than 80% of the AIT, measured in degrees Celsius, of any flammable gases or vapors that may be present. Further, control system processor 112 is configured to enable the turbine control system processor 114 to control the loading and unloading of gas turbine 102, the relative position of the IGVs 108, and the relative position of exhaust bypass damper 104.

Figure 2:
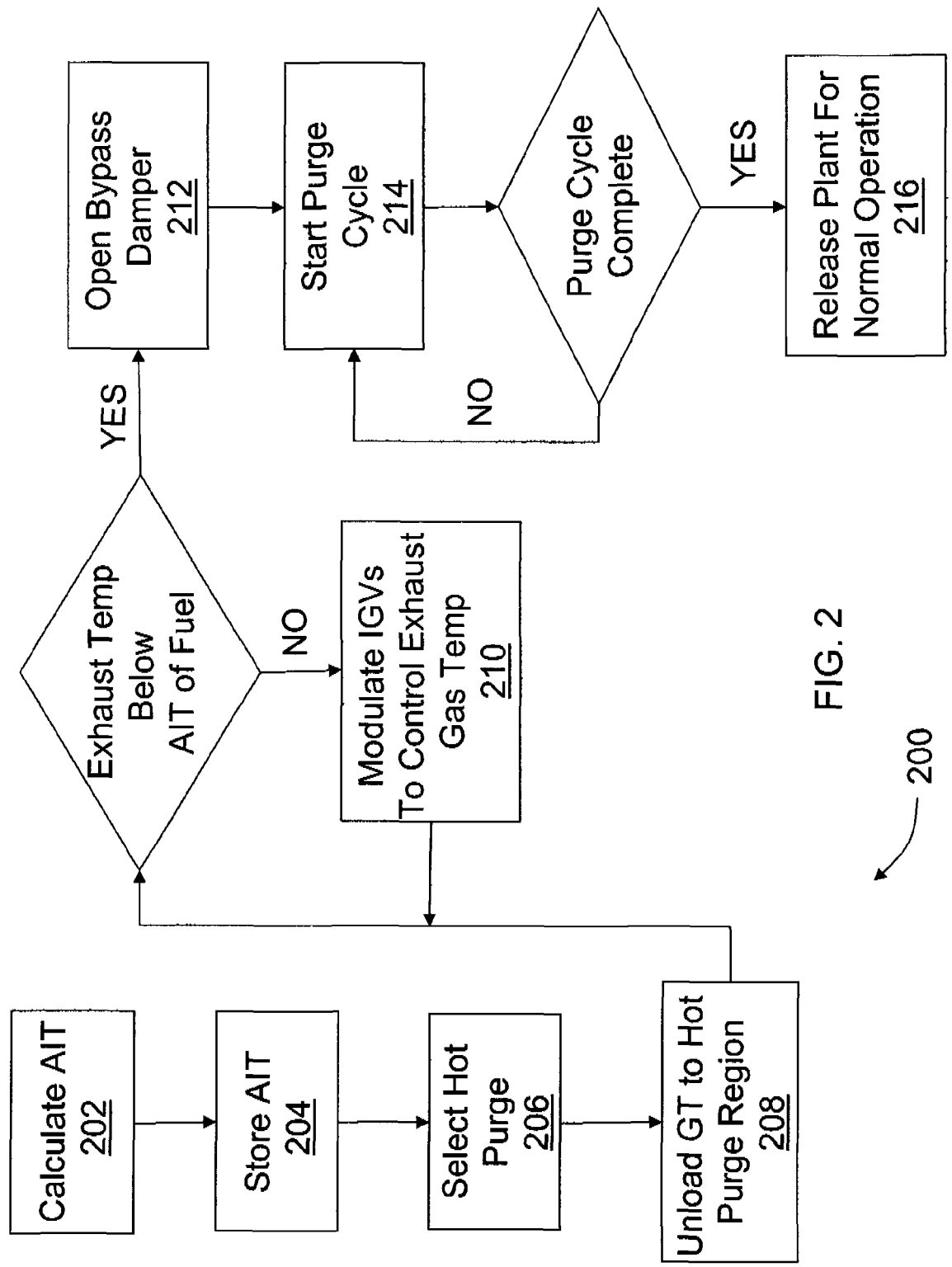
FIG. 2 is a flow chart illustrating an exemplary method used to initiate and control a hot purge of an HRSG, such as may be used with the control system shown in FIG. 1.

FIG. 2 is a flow chart of an exemplary method 200 that may be used to initiate and control a hot purge of a heat recovery steam generator, such as HRSG 106 (shown in FIG. 1). The exemplary method 200 is based on a comparison of the temperature of the exhaust gas from a gas turbine, such as gas turbine 102 (shown in FIG. 1) with a pre-determined auto-ignition temperature (AIT) of the fuel in use in a combined-cycle power system. The AIT is a function of the constituents of the fuel and is calculated 202 based on algorithms published by NFPA and ISO. The AIT is then stored 204 in a system memory of a control system, such as control system 100 (shown in FIG. 1).

In the exemplary embodiment, and when the gas turbine is at load, the associated inlet guide vanes, such as IGVs 108 (shown in FIG. 1) are opened, and an associated exhaust bypass damper, such as exhaust bypass damper 104 (shown in FIG. 1) closed, the system operator initiates 206 the hot purge of HRSG 106 via control system 100.

Once the hot purge has been initiated 206, in the exemplary embodiment, control system processor 112 (shown in FIG. 1) communicates to turbine control system processor 114 (shown in FIG. 1) that a hot purge of HRSG 106 has been initiated. The gas turbine 102 is unloaded 208 to a pre-determined operating level within a hot purge region. The hot purge region of operation of gas turbine 102 is within a range of a zone of lower operating loads such as, but not limited to, approximately 10-20% of the nominal load. When the unloading 208 of gas turbine 102 is complete, turbine control system processor 114 then modulates or repositions 210 the IGVs 108 to facilitate reducing the gas turbine exhaust temperature to the required temperature range. As the temperature of the gas turbine exhaust is reduced, turbine control system processor 114 receives data representative of the exhaust temperature and the gas turbine exhaust temperature is compared to the stored 204 AIT.

In the exemplary embodiment, when the gas turbine exhaust gas temperature reaches a pre-determined level, per NFPA 85 or ISO 21789, exhaust bypass damper 104 is opened 212 to a hot purge position. Repositioning exhaust bypass damper 104 allows air to enter HRSG 106, thus purging and exchanging 214 the contents of HRSG 106. Exhaust bypass damper 104 remains open to the hot purge position until a pre-determined volume of air is exchanged within HRSG 106. The time period that exhaust bypass damper 104 remains open is determined by the total volume of air required to be exchanged, per NFPA 85 or ISO 21789, and the available volume of HRSG 106.

When the required volume of air has been exchanged, gas turbine 102 is released 216 for normal operations. At such time, to resume normal operations, exhaust bypass damper 104 is moved to a full open position, thus substantially full operation of the HRSG 106 and associated processes. The IGVs 108 are then repositioned to a normal operating position, and the load of gas turbine 102 is then increased to its normal operating region.

The above-described methods and apparatus facilitate improving power system startup time and operability. Calculating the AIT of the gas turbine fuel and comparing the gas turbine exhaust temperature with the AIT, allows the gas turbine to be kept online in a simple cycle mode while the HRSG is purged of exhaust gases and other potentially hazardous fumes and/or vapors. The ability to keep the gas turbine online facilitates a faster power system startup time and allows the power system to continue to produce power during the purge.

Exemplary embodiments of methods and apparatus that facilitate a hot purge of an HRSG are described above in detail. The methods and apparatus are not limited to the specific embodiments described herein, but rather, components of the methods and apparatus may be utilized independently and separately from the other components described herein. For example, the calculation of the AIT for the fuel used in the power system may also be completed and/or used in combination with other industrial plant or component design and monitoring systems and methods, and is not limited to practice with only power systems as described herein. Rather, the present invention can be implemented and utilized in connection with many other component or plant designs and monitoring applications.

While the invention has been described in terms of various specific embodiments, those skilled in the art will recognize that the invention can be practiced with modification within the spirit and scope of the claims.

What is claimed is:

1. A method for operating an energy system, said method comprising:
    calculating an auto-ignition temperature of a fuel in use with the energy system;
    storing the auto-ignition temperature in a system memory;
    unloading a gas turbine associated with the energy system to a pre-determined range of operations;
    controlling a temperature of an exhaust flow discharged from the gas turbine to the energy system;
    opening an exhaust bypass damper to a pre-determined position based on a comparison between the temperature of the gas turbine exhaust and the auto-ignition temperature of the fuel in use such that the gas turbine exhaust bypassed the energy system to enable a pre-determined volume of air to enter an exhaust flow path defined within the energy system; and
    releasing the energy system for normal operation after a pre-determined amount of time has elapsed.

2. A method in accordance with claim 1 wherein unloading a gas turbine associated with the energy system comprises reducing a load on the gas turbine to a pre-determined range on a load profile associated with the gas turbine such that the gas turbine remains synchronized while the exhaust temperature is facilitated to be reduced.

3. A method in accordance with claim 1 wherein opening an exhaust bypass damper to a pre-determined position further comprises opening the exhaust bypass damper to a pre-determined position when the gas turbine exhaust temperature is lower, by a pre-determined amount, than the auto-ignition temperature of the fuel in use.

4. A method in accordance with claim 1 wherein opening an exhaust bypass damper comprises opening the exhaust bypass damper to facilitate exchanging a pre-determined volume of air within the energy system.

5. A method in accordance with claim 1 wherein releasing the energy system for normal operation comprises:
- repositioning the exhaust bypass damper to its normal operating position;
- repositioning a plurality of inlet guide vanes to their normal operating position; and
- increasing the load of the gas turbine to its normal operating range.

6. A method for controlling a hot purge of a heat recovery steam generator, wherein said heat recovery steam generator is part of a combined-cycle power system including a control system processor and a system memory, said method comprising:
- calculating an auto-ignition temperature of a fuel in use with the combined-cycle power system;
- storing the auto-ignition temperature in the system memory;
- unloading a gas turbine associated with the combined-cycle power system to a hot purge range of operations;
- controlling the operation of a plurality of inlet guide vanes of the gas turbine to control a temperature of a gas turbine exhaust;
- opening an exhaust bypass damper to a hot purge position based on a comparison between the temperature of the gas turbine exhaust and the auto-ignition temperature stored in the system memory such that the gas turbine exhaust bypassed the heat recovery steam generator to enable a pre-determined volume of air to enter the heat recovery steam generator; and
- releasing the combined-cycle power system for normal operation after a pre-determined amount of time has elapsed.

7. A method in accordance with claim 6 wherein unloading a gas turbine associated with the energy system comprises reducing a load on the gas turbine to a pre-determined range on a load profile associated with the gas turbine such that the gas turbine remains synchronized while the exhaust temperature is facilitated to be reduced.

8. A method in accordance with claim 6 wherein opening an exhaust bypass damper comprises opening the exhaust bypass damper based on a comparison between the temperature of the gas turbine exhaust and the auto-ignition temperature stored in the system memory.

9. A method in accordance with claim 8 wherein opening an exhaust bypass damper further comprises opening the exhaust bypass damper based on a gas turbine exhaust temperature lower, by a pre-determined amount, than the auto-ignition temperature stored in the system memory.

10. A method in accordance with claim 6 wherein opening an exhaust bypass damper further comprises opening the exhaust bypass damper to facilitate exchanging a pre-determined volume of a heat recovery steam generator.

11. A method in accordance with claim 6 wherein releasing the system for normal operation comprises:
- repositioning the exhaust bypass damper to its normal operating position;
- repositioning the plurality of inlet guide vanes to their normal operating position;
- increasing the load of the gas turbine to its normal operating range.

* * * * *